US009979705B2

(12) United States Patent
Davis et al.

(10) Patent No.: US 9,979,705 B2
(45) Date of Patent: *May 22, 2018

(54) CALLER-IDENTITY BASED SECURITY

(71) Applicant: International Business Machines Corporation, Armonk, NY (US)

(72) Inventors: Brent L. Davis, Deerfield Beach, FL (US); Peeyush Jaiswal, Boca Raton, FL (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 305 days.

This patent is subject to a terminal disclaimer.

(21) Appl. No.: 14/863,598

(22) Filed: Sep. 24, 2015

(65) Prior Publication Data

US 2016/0014096 A1 Jan. 14, 2016

Related U.S. Application Data

(63) Continuation of application No. 11/611,996, filed on Dec. 18, 2006, now Pat. No. 9,172,493.

(51) Int. Cl.
*H04L 29/06* (2006.01)
*H04K 1/00* (2006.01)
(Continued)

(52) U.S. Cl.
CPC .......... *H04L 63/0428* (2013.01); *H04K 1/00* (2013.01); *H04M 3/16* (2013.01); *H04W 12/02* (2013.01); *H04W 12/06* (2013.01); *H04W 12/04* (2013.01)

(58) Field of Classification Search
None
See application file for complete search history.

(56) References Cited

U.S. PATENT DOCUMENTS 6,854,010 B1 * 2/2005 Christian ............... G06Q 10/10
709/219
2003/0002651 A1 * 1/2003 Shires ............... H04M 3/42195
379/265.01

(Continued)

OTHER PUBLICATIONS

Notice of Allowance (dated Dec. 18, 2006), U.S. Appl. No. 11/611/996, filed Dec. 18, 2006, Conf. No. 5414.
(Continued)

*Primary Examiner* — William J. Goodchild
(74) *Attorney, Agent, or Firm* — Schmeiser, Olsen & Watts, LLP; John Pivnichny

(57) ABSTRACT

A method, digital telephone and computer-readable medium for providing a user identity-based secure channel between the digital telephone and a service provider. At the service provider, an encrypted voice transmission from a digital telephone is decrypted. The voice transmission was encrypted at the digital telephone by using a user voice encryption key that was created in the digital telephone. The user voice encryption key was created at the digital telephone by inputting a telephone identifier and a called telephone number into a public encryption key algorithm that is supplied by the service provider. By decrypting the encrypted voice transmission, the service provider is able to extract the voice transmission, the telephone identifier, and the called telephone number, thus allowing the service provider to route the voice transmission to an appropriate answering party at the service provider.

20 Claims, 8 Drawing Sheets

(51) Int. Cl.
*H04M 3/16* (2006.01)
*H04W 12/06* (2009.01)
*H04W 12/02* (2009.01)
*H04W 12/04* (2009.01)

(56) References Cited

U.S. PATENT DOCUMENTS

2003/0120592 A1* 6/2003 Ng .................... G06Q 20/04
                                                    705/39
2005/0232422 A1* 10/2005 Lin .................... H04K 1/00
                                                    380/255
2008/0144827 A1   6/2008 Davis et al.

OTHER PUBLICATIONS

Amendment (dated May 20, 2015), U.S. Appl. No. 11/611/996, filed Dec. 18, 2006, Conf. No. 5414.
Office Action (dated Feb. 20, 2015), U.S. Appl. No. 11/611/996, filed Dec. 18, 2006, Conf. No. 5414.
RCE (Aug. 20, 2014), U.S. Appl. No. 11/611/996, filed Dec. 18, 2006, Conf. No. 5414.
Examiner's Answer (dated Jul. 11, 2011), U.S. Appl. No. 11/611/996, filed Dec. 18, 2006, Conf. No. 5414.
Appeal Brief (dated Apr. 14, 2011), U.S. Appl. No. 11/611/996, filed Dec. 18, 2006, Conf. No. 5414.
Final Office Action (dated Nov. 22, 2010), U.S. Appl. No. 11/611/996, filed Dec. 18, 2006, Conf. No. 5414.
Amendment (dated Sep. 8, 2010), U.S. Appl. No. 11/611/996, filed Dec. 18, 2006, Conf. No. 5414.
Office Action (dated Jun. 8, 2010), U.S. Appl. No. 11/611/996, filed Dec. 18, 2006, Conf. No. 5414.

* cited by examiner

US 9,979,705 B2

CALLER-IDENTITY BASED SECURITY

This application is a continuation application claiming priority to Ser. No. 11/611,996, filed Dec. 18, 2006, now U.S. Pat. No. 9,172,493, issued Oct. 27, 2015.

BACKGROUND OF THE INVENTION

1. Technical Field

The present invention relates in general to the field of computers, and more particularly to the use of computers utilized by call contact centers. Still more particularly, the present invention relates to establishing a secure channel between a call contact center and a caller.

2. Description of the Related Art

Contact centers are a central point in an enterprise from which customer contacts are managed. These customer contacts are usually telephone calls requesting service, such as technical service support for products bought or leased from the enterprise. For example, FIG. 1 depicts a contact center customer 102 placing a telephone call to an enterprise contact center 104. This telephone call is handled by a call router 106, which may be a switchboard operator, or more likely, an automated call router that uses some type of keypad (using Dual-Tone Multi-Frequency—DTMF) or voice activated (using Interactive Voice Response—IVR) menu for directing the call to the appropriate department 108*a-c* or enterprise employee 110*a-c*. A major problem with such DTMF and IVR systems is that they are frustratingly time-consuming for the caller.

Another problem with the system shown in FIG. 1 is that the telephone calls are not secure, and therefore DTMF inputs (including those used to enter credit card information) may be easily overheard with a simple wiretap.

SUMMARY OF THE INVENTION

To address the problems described above, the present invention provides for a method, system and computer-readable medium for providing a user identity-based secure channel between a digital telephone and a service provider. At the service provider, an encrypted voice transmission from a digital telephone is decrypted. The voice transmission was encrypted at the digital telephone by using a user voice encryption key that was created in the digital telephone. The user voice encryption key was created at the digital telephone by inputting a telephone identifier and a called telephone number into a public encryption key algorithm that is supplied by the service provider. By decrypting the encrypted voice transmission, the service provider is able to extract the voice transmission, the telephone identifier, and the called telephone number, thus allowing the service provider to route the voice transmission to an appropriate answering party at the service provider.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
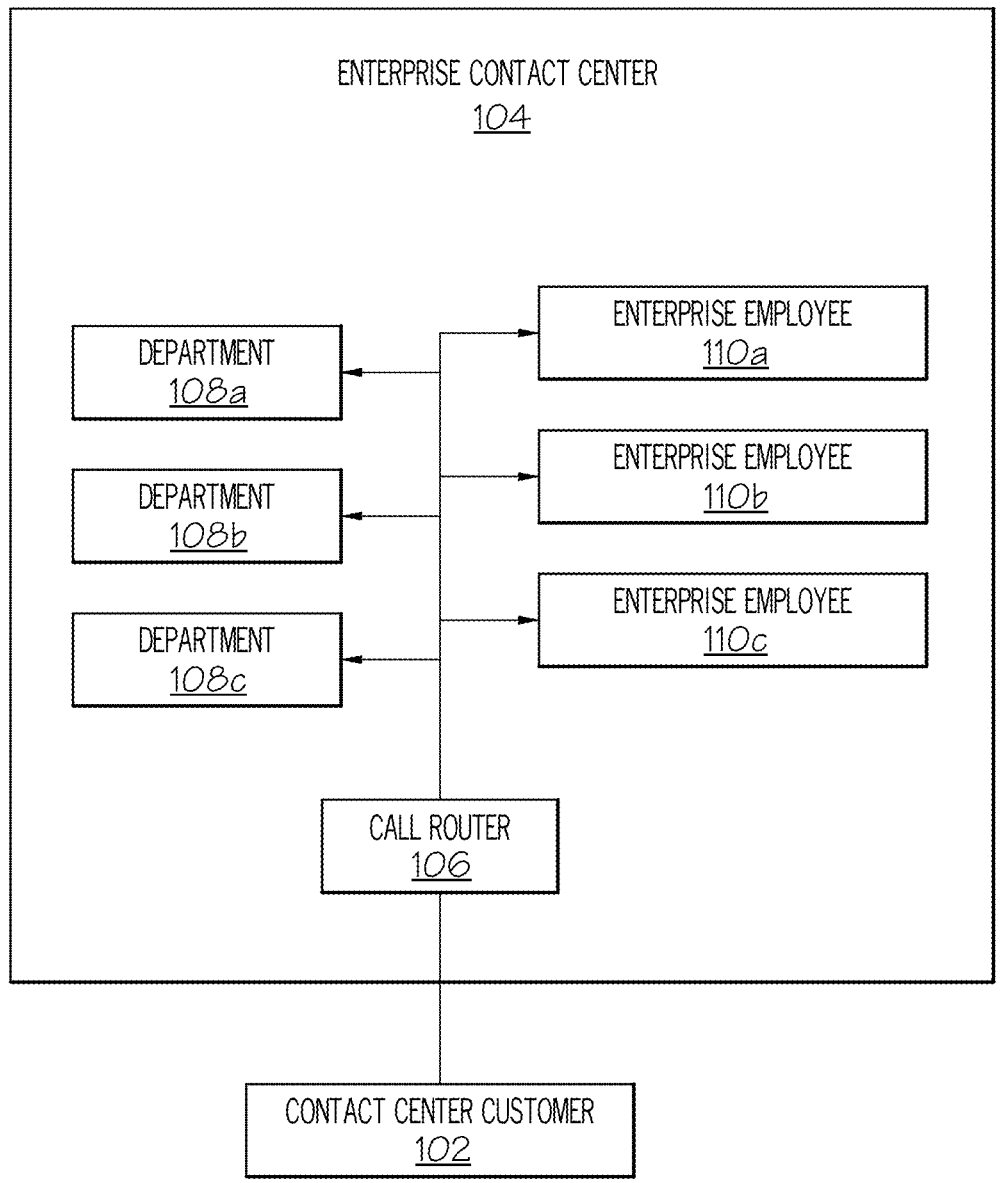
FIG. 1 depicts a prior art enterprise call center having a standard call router.
Figure 2:
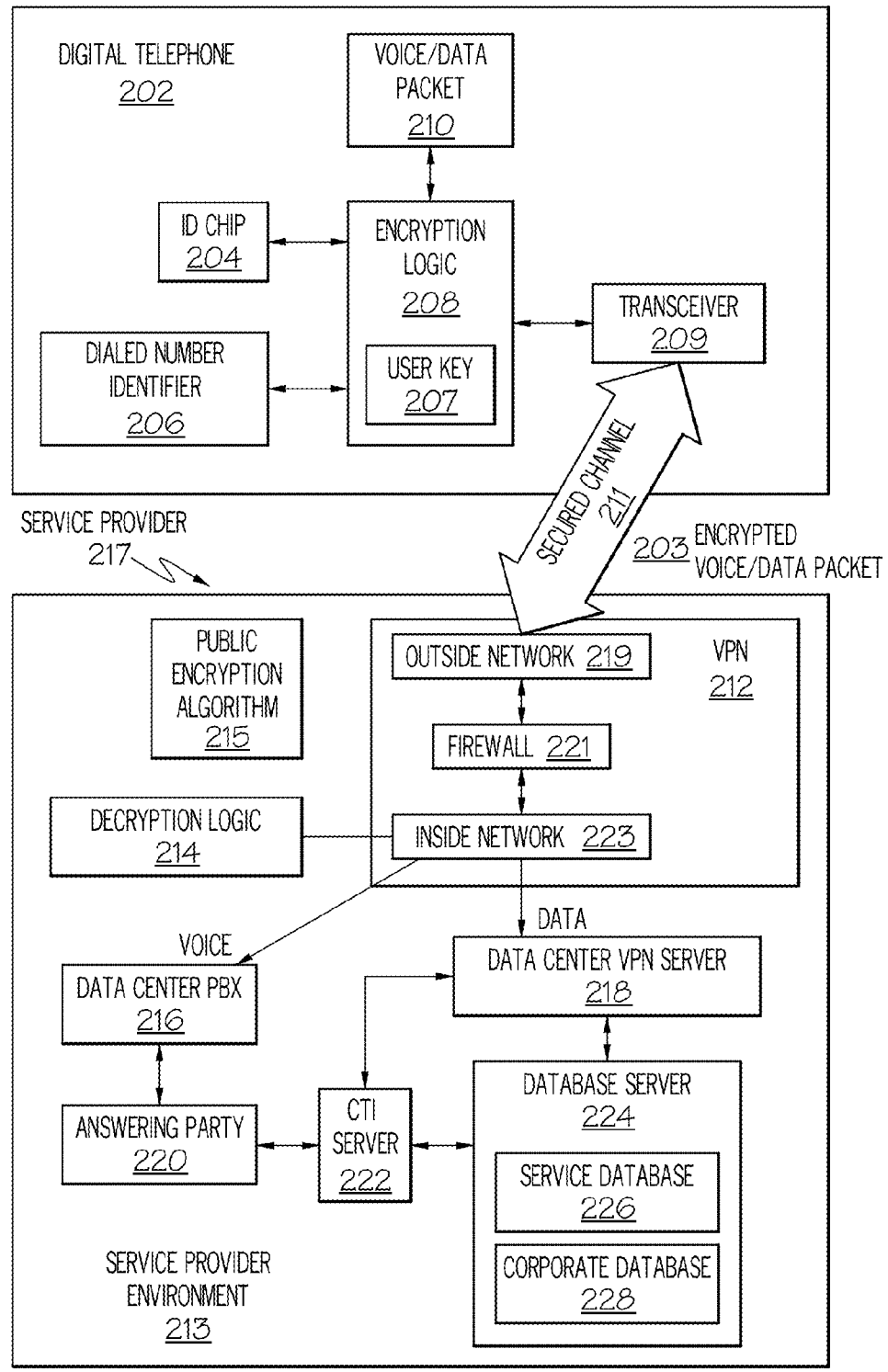
FIG. 2 illustrates a system for establishing a caller identity-based secure channel between a digital telephone and a service provider's Virtual Private Network (VPN)

With reference now to FIG. 2A, a high-level overview of the architecture of a digital telephone 202 and a service provider environment 213 is presented.

Digital telephone 202 may be any digital telephone, including but not limited to a digital cellular telephone, a wireless Personal Digital Assistant (PDA), a Voice Over Internet Protocol (VoIP) enabled phone, etc. Within digital telephone 202 is an Identification (ID) chip 204, which includes information specific for digital telephone 202. Such information includes, but is not limited to, a unique identifier that identifies the digital telephone 202 itself. This unique identifier may include a telephone number assigned to the digital telephone 202, a Universal Unique Identifier (UUID) for the hardware that makes up the digital telephone 202, or, preferably, a combination of the telephone number and the UUID. In one embodiment, ID chip 204 includes information that is specific for an authorized user of digital telephone 202. The information in ID chip 204 includes, but is not limited to, the name of one or more authorized users of services provided by the service provider environment 213, a level of service that is authorized to be provided by the service provider to the named user(s), which specific department within the service provider environment is to receive a call from the digital telephone according to the level of service that is authorized to be provided by the service provider, etc.

Also within the digital telephone 202 is a dialed number identifier 206. Whenever a telephone call is placed from the digital telephone 202, the dialed number identifier 206 stores (preferably in a dedicated register) the number to which the current call was made. Note that when the call is received by the service provider VPN 212, in a preferred embodiment the service provider VPN 212 does not initially know (using Dialed Number Identification Service (DNIS) or similar technology) which number the digital telephone 202 called, since, as will be described later, the current call is encrypted. This gives the service provider VPN 212 the ability to receive and route calls to multiple service provider numbers in a secure manner, such that a wiretap is not able to determine which number is being called by the digital telephone 202.

In a preferred embodiment, an encryption logic 208 is able to utilize a public encryption algorithm 215, which is provided by the service provider 217, to encrypt a voice/data packet 210. That is, encryption logic 208 uses information in ID chip 204 and dialed number identifier 206 to create a unique encryption user key 207. More specifically, user key 207 is created by using information from ID chip 204 and dialed number identifier 206 as inputs into a public encryption algorithm 215, which is provided by the service provider 217. This process creates an encryption user key 207 that: 1) is unique for a specific user/phone; 2) is unique for a dialed number to service provider 217; and 3) may be used to encrypt either digital voice information or digital data information. (Digital voice information is defined as data that has been digitized from a spoken input. Digital data information is defined as data that has been digitized from a mechanical input, such as a keyboard, keypad, touch screen, etc.) Furthermore, by using other information from ID chip 204, the user key can have a granularity that is based on other information about the digital telephone 202 or its user, such that the user key 207 is unique for: 4) a level of service that is authorized to be provided by the service provider to the named user(s); 5) which specific department within the service provider environment is to receive a call from the digital telephone according to the level of service that is authorized to be provided by the service provider, et al.

Once the voice/data packet 210 is encrypted by encryption logic 208, the encrypted voice/data packet 203 is sent by a transceiver 209 to a service provider's Virtual Private Network (VPN) 212. A VPN is understood by those skilled in the art of telecommunication as being a private communications network that is used by an enterprise. In a preferred embodiment, service provider's VPN 212 has a protected ("inside") network 223 which is protected from an unsecured ("outside") network 219 by a firewall 221 or similar security protection. Thus, communication between digital telephone 202 and resources behind the service provider's VPN 212 are protected both by the encrypted nature of the communication as well as by the firewall in the VPN 212.

Once the encrypted voice/data packet 203 reaches the service provider's VPN 212 and is at the inside network 223, the encrypted voice/data packet 203 is decrypted by decryption logic 214. This decryption not only extracts an unencrypted version of the voice/data packet 210 from the encrypted voice/data packet 203, but the decryption also extracts information from ID chip 204 and dialed number identifier 206 which were used in creating the user key 207. Using this extracted information (initially found in ID chip 204 and dialed number identifier 206), the VPN 212 is able to route the call to the appropriate receiver. For example, if the transmitted packet is digital voice information, then it is sent to a data center Private Branch eXchange (PBX) 216, which directs the call to an answering party 220. Note that the answering party 220 to which the call is directed is a person who 1) has the expertise needed to answer the call; 2) is in a department for which the caller is authorized to access; and 3) is authorized to provide the level of service to which the caller is entitled (authorized).

If the encrypted voice/data packet 203 contains only encrypted data information, then the decrypted call is directed to a data center VPN server 218, which directs the communication to an appropriate database server 224, which has access to a service database 226 or corporate database 228 to which the caller is authorized access.

If the encrypted voice/data packet 203 contains both voice and data information, then the decrypted call is directed to a Computer Telephone Integration (CTI) server 222, which returns requested authorized data from the database server 224, and forwards the voice portion of the call to the call answerer 220, whose qualities are described above.

Figure 3:
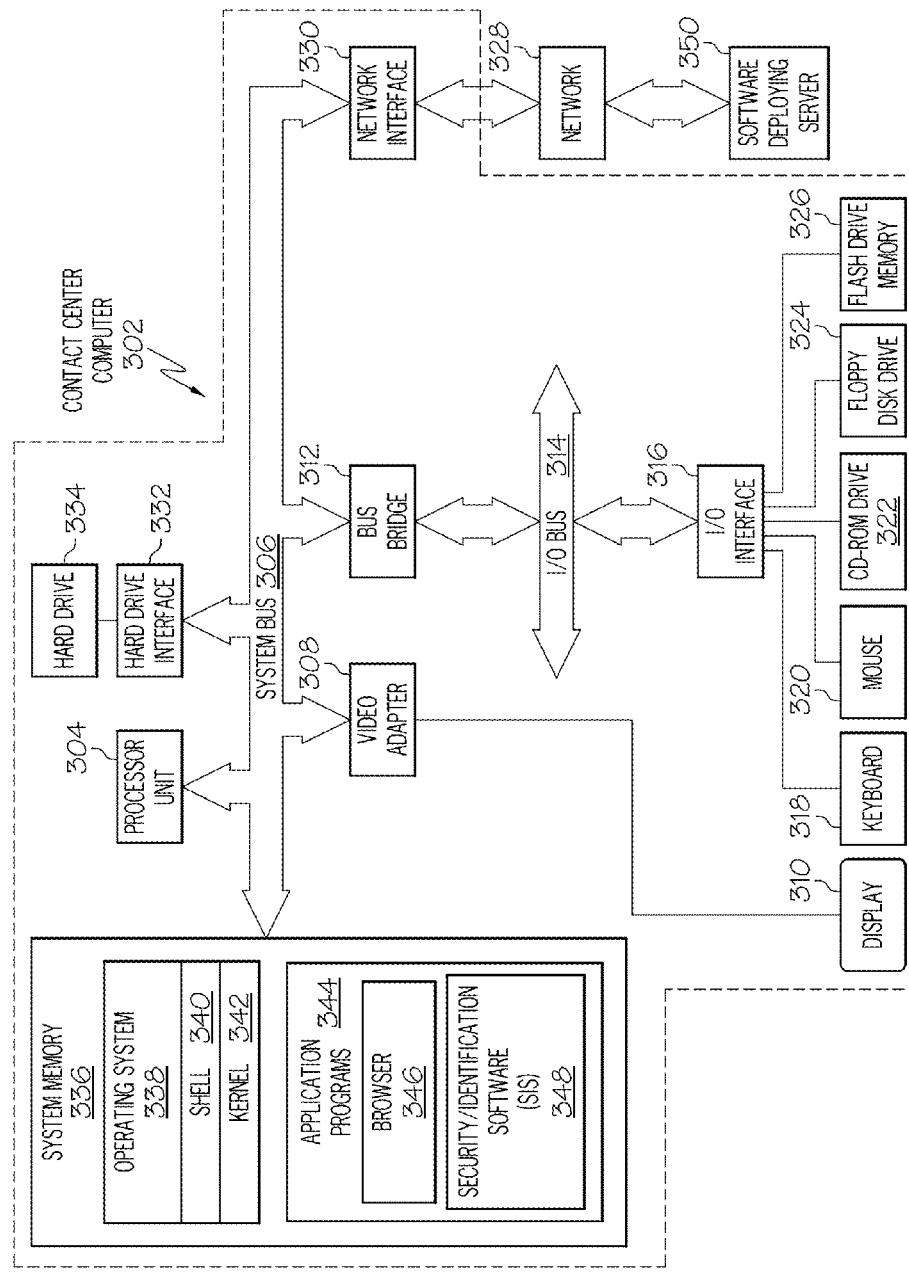
FIG. 3 illustrates an exemplary contact center computer in which the present invention may be utilized.

With reference now to FIG. 3, there is depicted a block diagram of an exemplary contact center computer 302, in which the present invention may be utilized. Note that some or all of the exemplary architecture shown for contact center computer 302 may be utilized by encryption logic 208, decryption logic 214, data center VPN server 218, database server 226 and corporate database 228 shown in FIG. 2, as well as software deploying server 350 shown in FIG. 3.

Contact center computer 302 includes a processor unit 304 that is coupled to a system bus 306. A video adapter 308, which drives/supports a display 310, is also coupled to system bus 306. System bus 306 is coupled via a bus bridge 312 to an Input/Output (I/O) bus 314. An I/O interface 316 is coupled to I/O bus 314. I/O interface 316 affords communication with various I/O devices, including a keyboard 318, a mouse 320, a Compact Disk—Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Contact center computer 302 is able to communicate with a software deploying server 350 via a network 328 using a network interface 330, which is coupled to system bus 306. Network 328 may be an external network such as the Internet, or an internal network such as an Ethernet or a Virtual Private Network (VPN). Note the software deploying server 350 may utilize a same or substantially similar architecture as contact center computer 302.

A hard drive interface 332 is also coupled to system bus 306. Hard drive interface 332 interfaces with a hard drive 334. In a preferred embodiment, hard drive 334 populates a system memory 336, which is also coupled to system bus 306. System memory is defined as a lowest level of volatile memory in contact center computer 302. This volatile memory includes additional higher levels of volatile memory (not shown), including, but not limited to, cache memory, registers and buffers. Data that populates system memory 336 includes contact center computer 302's operating system (OS) 338 and application programs 344.

OS 338 includes a shell 340, for providing transparent user access to resources such as application programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. Note that while shell 340 is a text-based, line-oriented user interface, the present invention will equally well support other user interface modes, such as graphical, voice, gestural, etc.

As depicted, OS 338 also includes kernel 342, which includes lower levels of functionality for OS 338, including providing essential services required by other parts of OS 338 and application programs 344, including memory management, process and task management, disk management, and mouse and keyboard management.

Application programs 344 include a browser 346. Browser 346 includes program modules and instructions enabling a World Wide Web (WWW) client (i.e., contact center computer 302) to send and receive network messages to the Internet using HyperText Transfer Protocol (HTTP) messaging, thus enabling communication with software deploying server 350.

Application programs 344 in contact center computer 302's system memory (as well as software deploying server 350's system memory) also include a Security/Identification Software (SIS) 348. SIS 348 includes code for implementing the processes described in FIGS. 2 and 4. In one embodiment, contact center computer 302 is able to download SIS 348 from software deploying server 350.

The hardware elements depicted in contact center computer 302 are not intended to be exhaustive, but rather are representative to highlight essential components required by the present invention. For instance, contact center computer 302 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 350 performs all of the functions associated with the present invention (including execution of SIS 348), thus freeing contact center computer 302 from having to use its own internal computing resources to execute SIS 348.

Figure 4:
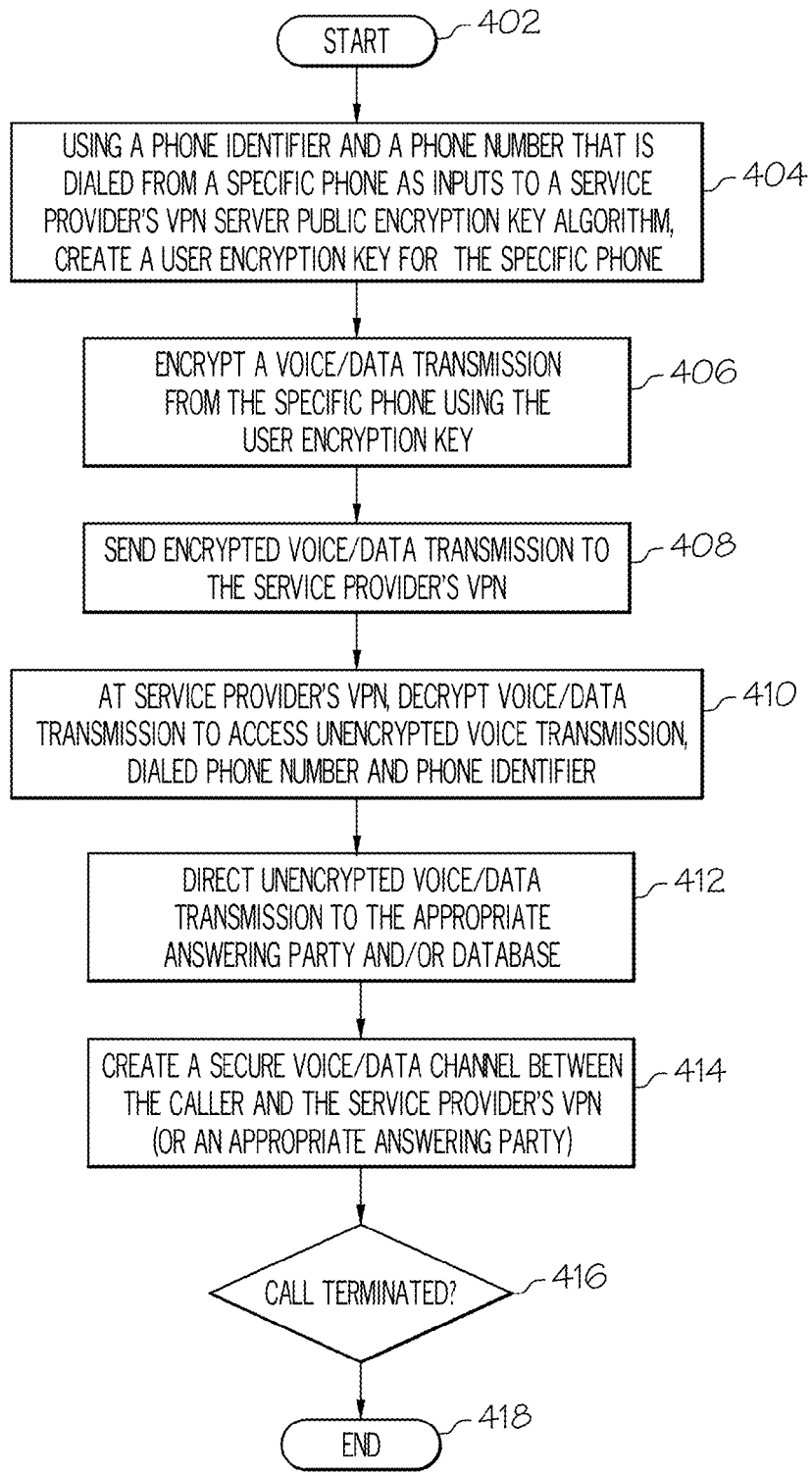
FIG. 4 is a flow-chart of exemplary steps taken by the present invention to establish a caller identity-based secure channel between a digital telephone and a service provider's VPN.

With reference now to FIG. 4, a high level flow chart of exemplary steps taken to create a user-oriented secure channel between a digital telephone and a service provider (service center) is provided. After initiator block 402, a user key is created by using 1) a phone identifier (e.g., information from ID chip 204 described in FIG. 2) and 2) a phone number (e.g., for a service provider) that is dialed from the phone as inputs into an encryption key algorithm (provided by the service provider), as described in block 404. Using the uniquely generated user key, a voice/data transmission is encrypted in the digital phone (block 406), and sent encrypted to a service provider's VPN (block 408). At the service provider's VPN (block 410), the encrypted voice/data transmission is decrypted to reveal 1) the phone identifier; 2) the phone number that was called; and 3) the voice/data information itself. The unencrypted voice/data transmission is then directed to the appropriate answering party and/or database (block 412). By using the user's key, the answering party and/or data can then encrypt subsequent responsive voice and data transmissions, thus creating a secure voice/data channel between the caller and the service provider (block 414). When the call terminates (block 416), the process ends (terminator block 418).

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of SIS 348, are performed by service provider server 350. Alternatively, SIS 348 and the method described herein, and in particular as shown and described in FIGS. 2 and 4, can be deployed as a process software from service provider server 350 to contact center computer 302. Still more particularly, process software for the method so described may be deployed to service provider server 350 by another service provider server (not shown).

Figure 5A:
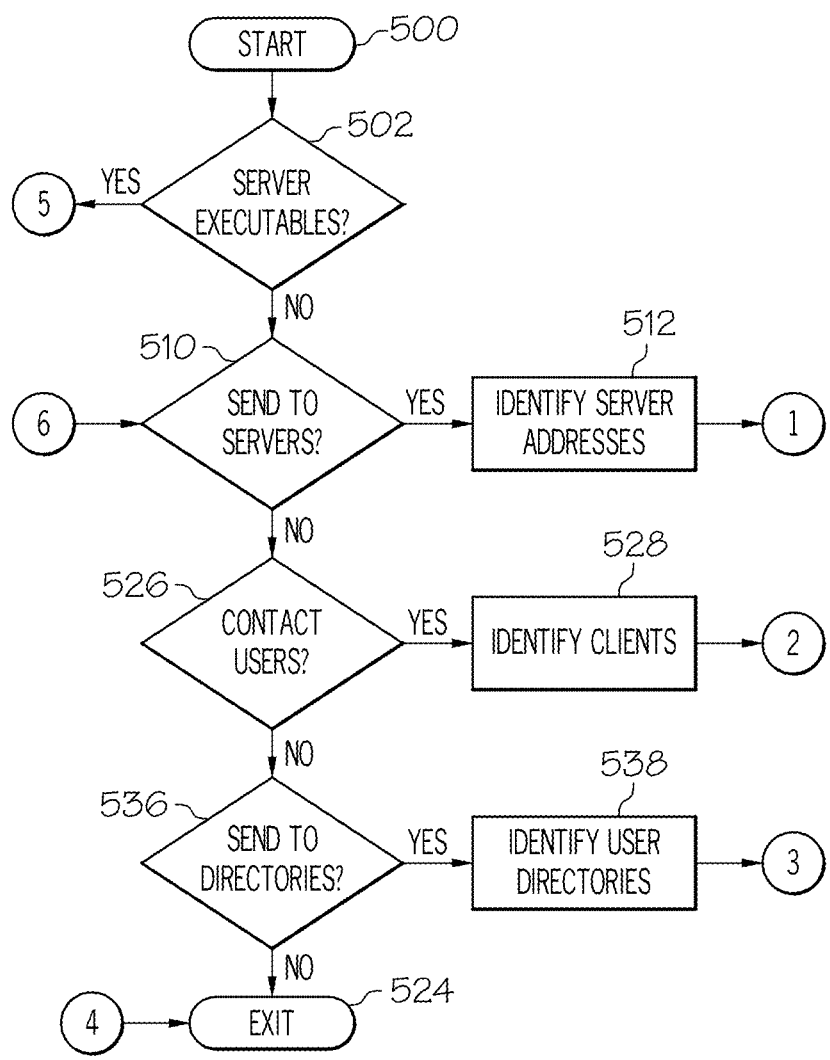
FIGS. 5A-B are flow-charts showing steps taken to deploy software capable of executing the steps described in FIG. 4.
Figure 5B:
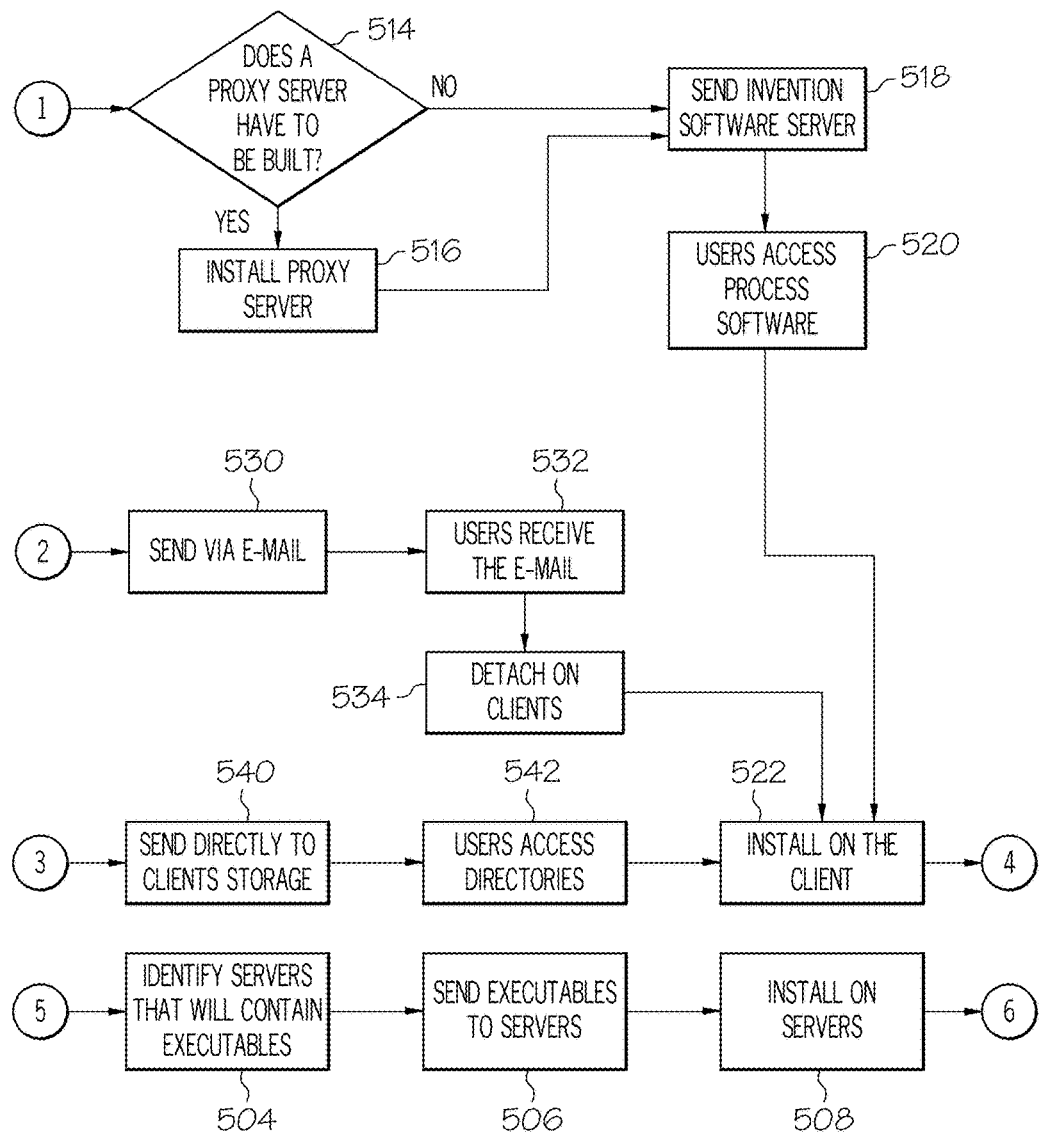

Referring then to FIGS. 5A-B, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users, via their contact center computers, then access the process software on the servers and copy to their contact center computers file systems (block 520). Another embodiment is to have the servers automatically copy the process software to each client and then run the installation program for the process software at each contact center computer. The user executes the program that installs the process software on his contact center computer (block 522) then exits the process (terminator block 524).

In query step 526, a determination is made whether the process software is to be deployed by sending the process software to users via e-mail. The set of users where the process software will be deployed are identified together with the addresses of the user contact center computers (block 528). The process software is sent via e-mail to each of the users' contact center computers (block 530). The users then receive the e-mail (block 532) and then detach the process software from the e-mail to a directory on their contact center computers (block 534). The user executes the program that installs the process software on his contact center computer (block 522) then exits the process (terminator block 524).

Lastly a determination is made as to whether the process software will be sent directly to user directories on their contact center computers (query block 536). If so, the user directories are identified (block 538). The process software is transferred directly to the user's contact center computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his contact center computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6A:
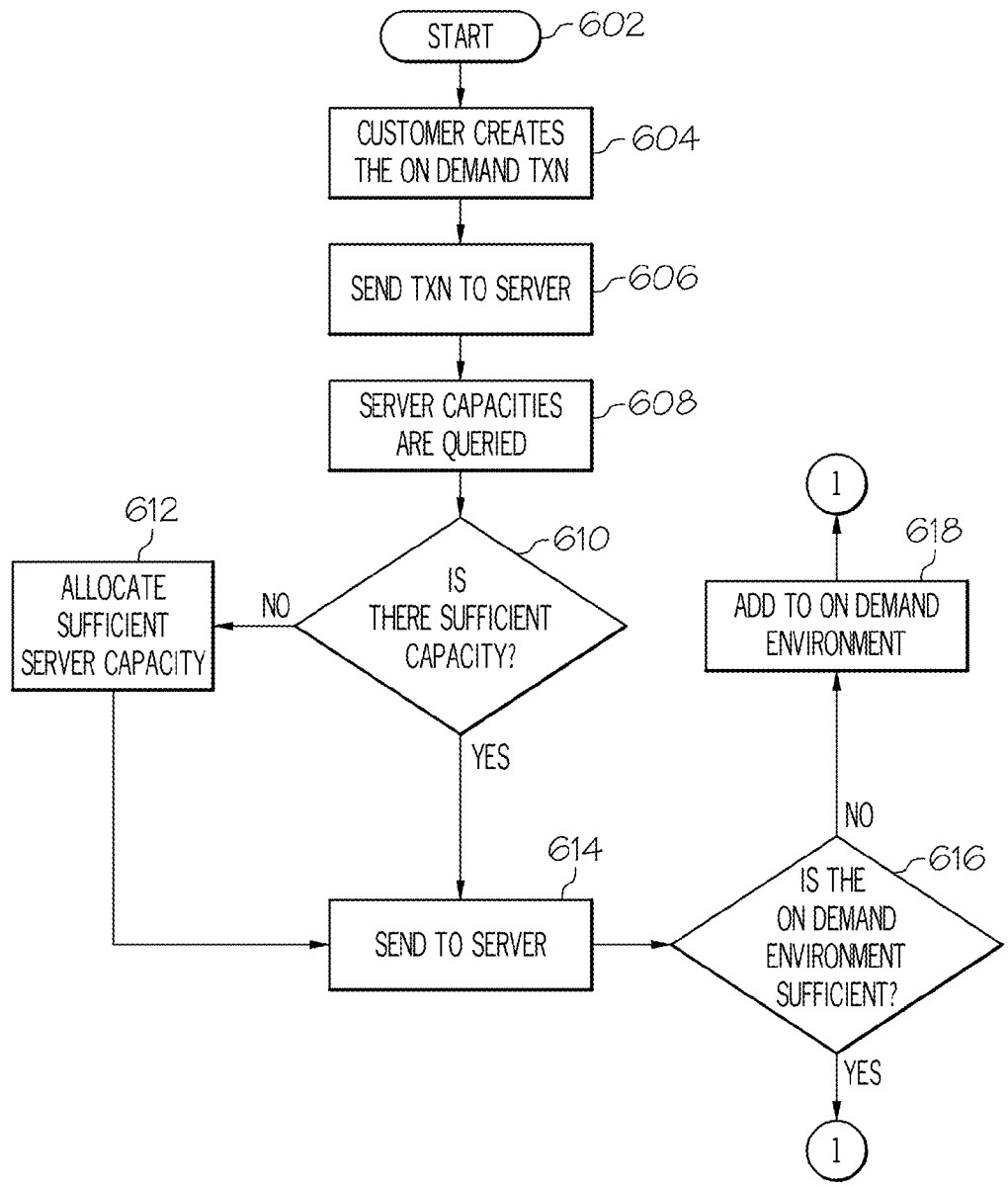
FIGS. 6A-B are flow-charts showing steps taken to execute the steps shown in FIG. 4 using an on-demand service provider.
Figure 6B:
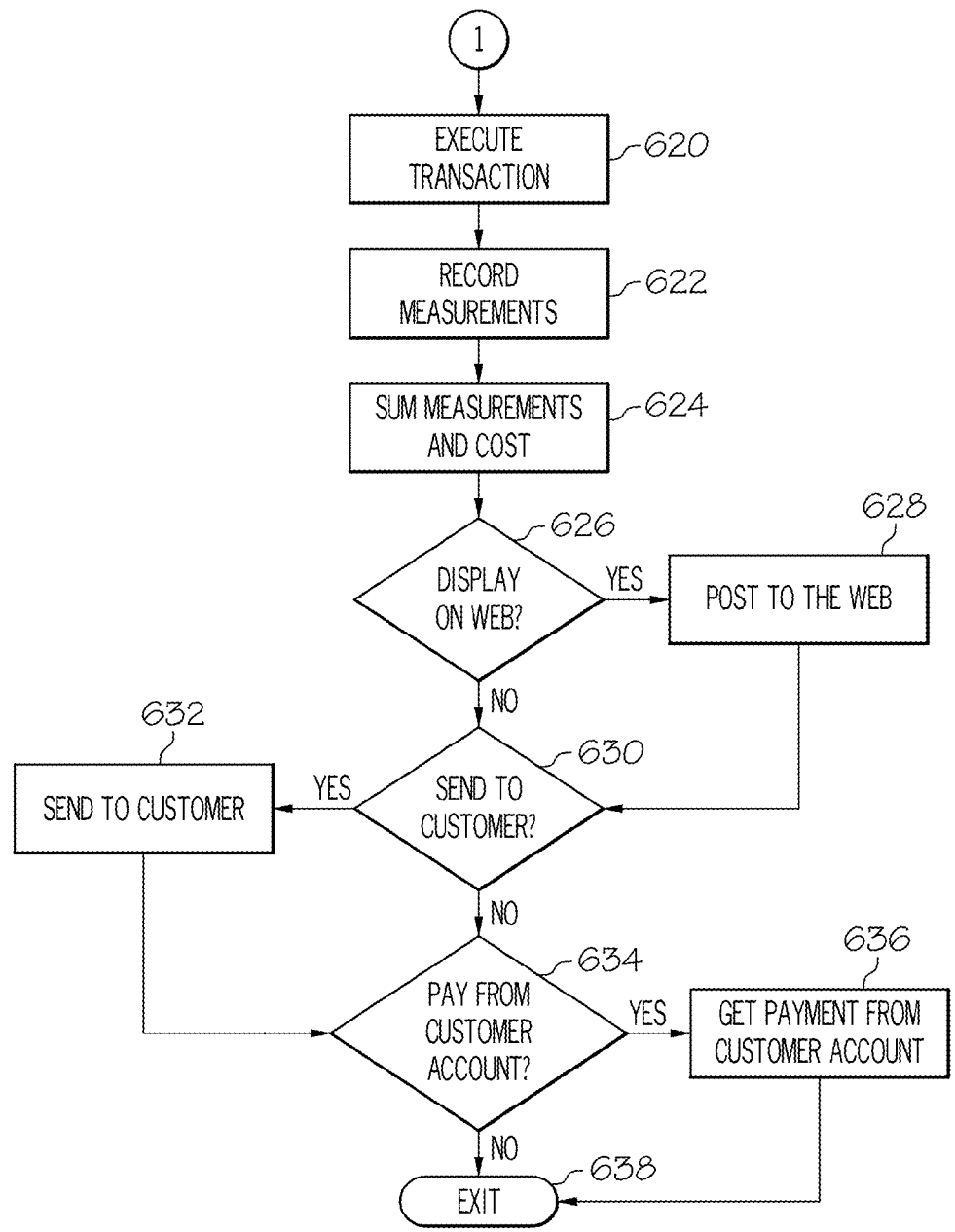

With reference now to FIGS. 6a-b, initiator block 602 begins the On Demand process. A transaction is created than contains the unique customer identification, the requested service type and any service parameters that further, specify the type of service (block 604). The transaction is then sent to the main server (block 606). In an On Demand environment the main server can initially be the only server, then as capacity is consumed other servers are added to the On Demand environment.

The server central processing unit (CPU) capacities in the On Demand environment are queried (block 608). The CPU requirement of the transaction is estimated, then the servers available CPU capacity in the On Demand environment are compared to the transaction CPU requirement to see if there is sufficient CPU available capacity in any server to process the transaction (query block 610). If there is not sufficient server CPU available capacity, then additional server CPU capacity is allocated to process the transaction (block 612). If there was already sufficient Available CPU capacity then the transaction is sent to a selected server (block 614).

Before executing the transaction, a check is made of the remaining On Demand environment to determine if the environment has sufficient available capacity for processing the transaction. This environment capacity consists of such things as but not limited to network bandwidth, processor memory, storage etc. (block 616). If there is not sufficient available capacity, then capacity will be added to the On Demand environment (block 618). Next the required software to process the transaction is accessed, loaded into memory, then the transaction is executed (block 620).

The usage measurements are recorded (block 622). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 624).

If the customer has requested that the On Demand costs be posted to a web site (query block 626), then they are posted (block 628). If the customer has requested that the On Demand costs be sent via e-mail to a customer address (query block 630), then these costs are sent to the customer (block 632). If the customer has requested that the On Demand costs be paid directly from a customer account (query block 634), then payment is received directly from the customer account (block 636). The On Demand process is then exited at terminator block 638.

As described herein, the present invention provides a method, system and computer-readable medium for providing a user-identity based secure channel between a digital telephone and a service provider.

At the service provider side, the method includes the steps of: decrypting, at the service provider, an encrypted voice transmission from a digital telephone, wherein the encrypted voice transmission has been encrypted at the digital telephone by using a user voice encryption key that was created in the digital telephone by inputting a telephone identifier, which is unique for the digital telephone, and a called telephone number into a public encryption key algorithm that is supplied by the service provider, and wherein decrypting the encrypted voice transmission provides the service provider with the voice transmission, the telephone identifier, and the called telephone number; and using the telephone identifier and the called telephone number as a basis for routing the voice transmission to an appropriate answering party at the service provider. In the scenario in which the digital telephone is a wireless Personal Digital Assistant (PDA), smart phone, or similar device, the method may further include the steps of decrypting, at the service provider, an encrypted data transmission from the PDA, wherein the user data encryption key was created in the PDA by inputting a PDA identifier and the called telephone number into the public encryption key algorithm, and wherein decrypting the encrypted data transmission provides the service provider with the data transmission, the PDA identifier, and the called telephone number; and routing the data transmission, to an appropriate data center Virtual Private Network (VPN) server in a service provider environment, based on the PDA identifier and the called telephone number. The method may further include the steps of routing the data transmission from the VPN server to a service database in the service provider environment. In another embodiment, the method includes the steps of encrypting data transmissions, from the service provider to the PDA, to create encrypted return data transmissions through the use of the user data encryption key; and transmitting the encrypted return data transmissions from the service provider to the PDA. Additionally, in a preferred embodiment, the secure channel between the digital telephone and the service provider is completed by encrypting voice transmissions, from the service provider to the digital telephone, to create encrypted return voice transmissions through the use of the user voice encryption key; and transmitting the encrypted return voice transmissions from the service provider to the digital telephone.

In a preferred embodiment, the digital telephone comprises: encryption logic in the digital telephone, wherein the encryption logic is structured to create a user voice encryption key in the digital telephone, the user voice encryption key being created by inputting a telephone identifier and a called telephone number into a public encryption key algorithm, and wherein the encryption logic utilizes the voice encryption key to encrypt a voice transmission from the digital telephone to a service provider. Preferably, the voice transmission is capable of being decrypted by the service provider to access the telephone identifier and the called telephone number as a basis for routing the voice transmission to an appropriate answering party at the service provider. In scenarios in which the digital telephone is a wireless Personal Digital Assistant (PDA), the encryption logic may be further structured for: creating a user data encryption key in the wireless PDA, the user data encryption key being created by inputting a PDA identification number and the called telephone number into the public encryption key algorithm; and using, in the PDA, the user data encryption key to encrypt a data transmission from the PDA to the service provider, thus enabling the service provider to: decrypt an encrypted data transmission from the PDA, wherein decrypting the encrypted data transmission provides the service provider with the data transmission, the PDA identification number, and the called telephone number, and route the data transmission, to an appropriate data center Virtual Private Network (VPN) server in a service provider environment, based on the PDA identification number and the called telephone number. In one embodiment of the digital telephone, the telephone identifier comprises a telephone number of the digital telephone, a name of a single authorized user of services provided by the service provider, and a level of service authorized to be provided by the service provider to the single authorized user of services. In a scenario in which the service provider is a call center that provides call support by telephone operators in a plurality of departments within a service provider environment, the telephone identifier identifies which specific department within the service provider environment is to receive a call from the digital telephone according to the level of service authorized to be provided by the service provider.

In a preferred embodiment of a computer-readable medium embodying computer program code for providing a user identity-based secure channel between a digital telephone and a service provider, the computer program code comprises computer executable instructions configured for: creating a user voice encryption key in a digital telephone, the user voice encryption key being created by inputting a telephone identifier and a called telephone number into a public encryption key algorithm; using, in the digital telephone, the user voice encryption key to encrypt a voice transmission from the digital telephone to the service provider; decrypting, at the service provider, an encrypted voice transmission from the digital telephone, wherein decrypting the encrypted voice transmission provides the service provider with the voice transmission, the telephone identifier, and the called telephone number; and routing the voice transmission to an appropriate answering party based on the telephone identifier and the called telephone number. In a scenario in which the digital telephone is a wireless Personal Digital Assistant (PDA), the computer executable instructions may be further configured for: creating a user data encryption key in a digital telephone, the user data encryption key being created by inputting a PDA identification number and the called telephone number into the public encryption key algorithm; using, in the digital telephone, the user data encryption key to encrypt a data transmission from the PDA to the service provider; decrypting, at the service provider, an encrypted data transmission from the PDA, wherein decrypting the encrypted data transmission provides the service provider with the data transmission, the PDA identification number, and the called telephone number; and routing the data transmission, to an appropriate data center Virtual Private Network (VPN) server in a service provider environment, based on the PDA identification number and the called telephone number. In one embodiment, the computer executable instructions are further configured for: routing the data transmission from the VPN server to a service database in the service provider environment. In another embodiment, the computer executable instructions are further configured for: encrypting data transmissions, from the service provider to the PDA, by using the user data encryption key; and transmitting encrypted data transmissions from the service provider to the PDA, wherein the encrypted data transmissions have been encrypted by the user data encryption key. In another embodiment, the computer executable instructions are further configured for: encrypting voice transmissions, from the service provider to the digital telephone, by using the user voice encryption key; and transmitting encrypted voice transmissions from the service provider to the digital telephone, wherein the encrypted voice transmissions have been encrypted by the user voice encryption key. Some or all of the computer executable instructions may be deployed to a contact center computer from a remote server in an on-demand manner.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method for providing a secure channel between a digital telephone and a service provider, the method comprising:
    decrypting, at the service provider, an encrypted voice transmission from a digital telephone, wherein decrypting the encrypted voice transmission provides the service provider with an unencrypted voice transmission, a telephone identifier, a called telephone number, wherein the telephone identifier comprises a telephone number of the digital telephone, a name of a single authorized user of services provided by the service provider and a level of service authorized to be provided by the service provider to the single authorized user of services; and
    routing the unencrypted voice transmission to an answering party at the service provider, using the called telephone number and the telephone identifier, including the name of the single authorized user and the level of service authorized for the single authorized user.

2. The method of claim 1, wherein the encrypted voice transmission has been encrypted at the digital telephone by using the user voice encryption key, wherein the user voice encryption key was created in the digital telephone by inputting a telephone identifier, and the called telephone number into a public encryption key algorithm that is supplied by the service provider.

3. The method of claim 1, wherein the digital telephone is a wireless Personal Digital Assistant (PDA).

4. The method of claim 3, further comprising:
    decrypting, at the service provider, an encrypted data transmission from the PDA, wherein a user data encryption key was created in the PDA by inputting a PDA identifier and the called telephone number into the public encryption key algorithm, and wherein decrypting the encrypted data transmission provides the service provider with an unencrypted data transmission, the PDA identifier, and the called telephone number; and
    routing the unencrypted data transmission, to a data center Virtual Private Network (VPN) server in a service provider environment, based on the PDA identifier and the called telephone number.

5. The method of claim 4, further comprising:
routing the unencrypted data transmission from the VPN server to a service database in the service provider environment.

6. The method of claim 1, further comprising:
encrypting voice transmissions, from the service provider to the digital telephone, to create encrypted return voice transmissions through the use of the user voice encryption key; and transmitting the encrypted return voice transmissions from the service provider to the digital telephone.

7. A digital telephone comprising:
encryption logic in the digital telephone, wherein the encryption logic is structured to create a user voice encryption key in the digital telephone, the user voice encryption key being created by inputting a telephone identifier and a called telephone number into a public encryption key algorithm, wherein the encryption logic utilizes the voice encryption key to encrypt a voice transmission from the digital telephone to a service provider, and wherein the telephone identifier includes a telephone number of the digital telephone, a number of a single authorized user of services provided by the service provider and a level of service authorized to be provided by the service provider to the single authorized user of services.

8. The digital telephone of claim 7, wherein the service provider is configured to decrypt the encrypted voice transmission to access the telephone identifier and the called telephone number, and wherein the service provider uses the telephone identifier and the called telephone number to route an unencrypted voice transmission, that is decrypted from the encrypted voice transmission by the service provider using the user voice encryption key, to an answering party at the service provider.

9. The digital telephone of claim 8, wherein the service provider is configured to decrypt the voice transmission and route the unencrypted voice transmission to an answering party at the service provider utilizing the called telephone number and the telephone identifier, including the name of the single authorized user and the level of service authorized to be provided by the service provider to the single authorized user.

10. The digital telephone of claim 7, wherein the digital telephone is a wireless Personal Digital Assistant (PDA), and wherein the encryption logic is further structured to:
create a user data encryption key in the wireless PDA, the user data encryption key being created by inputting a PDA identification number and the called telephone number into the public encryption key algorithm; and
use, in the PDA, the user data encryption key to encrypt a data transmission from the PDA to the service provider, wherein the service provider is configured to:
decrypt an encrypted data transmission from the PDA to provide the service provider with an unencrypted data transmission, the PDA identification number, and the called telephone number, and
route the unencrypted data transmission, to a data center Virtual Private Network (VPN) server in a service provider environment, based on the PDA identification number and the called telephone number.

11. The digital telephone of claim 7, wherein the service provider is a call center that provides a call support by telephone operators in a plurality of departments within a service provider environment, wherein the telephone identifier identifies which specific department within the service provider environment is to receive a call from the digital telephone according to the level of service authorized to be provided by the service provider; and wherein the service department is configured to route the call to the identified specific department associated with the level of service.

12. A computer-readable hardware storage device embodying computer program code for providing a secure channel between a digital telephone and a service provider, the computer program code comprising computer executable instructions configured for:
creating a user voice encryption key in a digital telephone, the user voice encryption key being created by inputting a telephone identifier and a called telephone number into a public encryption key algorithm;
using, in the digital telephone, the user voice encryption key to encrypt a voice transmission from the digital telephone to the service provider;
routing an unencrypted voice transmission to an answering party using the telephone identifier and the called telephone number, wherein the telephone identifier includes a telephone number of the digital telephone, a name of a single authorized user of services provided by the service provider and a level of service authorized to be provided by the service provider to the single authorized user of services that are utilized to determine the answering party to which to route the unencrypted voice transmission.

13. The computer-readable hardware storage device of claim 12, the computer executable instructions are further configured for:
decrypting, at the service provider, an encrypted voice transmission from the digital telephone, wherein decrypting the encrypted voice transmission provides the service provider with the unencrypted voice transmission, the telephone identifier, and the called telephone number.

14. The computer-readable hardware storage device of claim 12, wherein:
the digital telephone is a wireless Personal Digital Assistant (PDA); and
the computer executable instructions are further configured for:
creating a user data encryption key in the digital telephone, the user data encryption key being created by inputting a PDA identification number and the called telephone number into the public encryption key algorithm;
using, in the digital telephone, the user data encryption key to encrypt an unencrypted data transmission from the PDA to the service provider;
decrypting, at the service provider, [the encrypted data transmission from the PDA, wherein decrypting the encrypted data transmission provides the service provider with the unencrypted data transmission, the PDA identification number, and the called telephone number; and
routing the unencrypted data transmission, to a data center Virtual Private Network (VPN) server in a service provider environment, based on the PDA identification number and the called telephone number.

15. The computer-readable hardware storage device of claim 14, wherein the computer executable instructions are further configured for:

routing the unencrypted data transmission from the VPN server to a service database in the service provider environment.

16. The computer-readable hardware storage device of claim 14, wherein the computer executable instructions are further configured for:
   encrypting data transmissions, from the service provider to the PDA, by using the user data encryption key; and
   transmitting the encrypted data transmissions from the service provider to the PDA, wherein the encrypted data transmissions have been encrypted by the user data encryption key.

17. The computer-readable hardware storage device of claim 12, wherein the computer executable instructions are further configured for:
   encrypting voice transmissions, from the service provider to the digital telephone by using the user voice encryption key; and
   transmitting the encrypted voice transmissions from the service provider to the digital telephone, wherein the encrypted voice transmissions have been encrypted by the user voice encryption key.

18. The computer-readable hardware storage device of claim 12, wherein the computer-readable medium is a component of a remote server, and wherein the computer executable instructions are deployed to a contact center computer from the remote server.

19. The computer-readable hardware storage device of claim 12, wherein the computer executable instructions are provided by a service provider to a customer on an on-demand basis.

20. The computer-readable hardware storage device of claim 12, wherein:
   the service provider is a call center that provides call support by telephone operators in a plurality of departments within a service provider environment; and
   the computer program code further comprises computer executable instructions configured for: identifying from the telephone identifier which specific department within the service provider environment is to receive a call from the digital telephone according to the level of service authorized to be provided by the service provider to the single authorized user of services; and routing the call to the identified specific department associated with the level of service.

* * * * *